(12) United States Patent
Hullam

(10) Patent No.: US 7,017,462 B2
(45) Date of Patent: Mar. 28, 2006

(54) METHOD OF CUTTING A FIBER OPTIC CABLE

(75) Inventor: Laszlo Hullam, Woodstock, IL (US)

(73) Assignee: IDEAL Industries, Inc., Sycamore, IL (US)

( * ) Notice: Subject to any disclaimer, the term of this patent is extended or adjusted under 35 U.S.C. 154(b) by 0 days.

(21) Appl. No.: 11/006,839

(22) Filed: Dec. 8, 2004

(65) Prior Publication Data

US 2005/0092148 A1    May 5, 2005

Related U.S. Application Data

(62) Division of application No. 09/641,715, filed on Aug. 21, 2000, now abandoned.

(51) Int. Cl.
  *H02G 1/00* (2006.01)
  *B26B 13/06* (2006.01)

(52) U.S. Cl. .................... 83/14; 225/1; 225/93; 30/254

(58) Field of Classification Search ................ 83/13, 83/14, 947; 30/254; 225/1, 2, 4, 93, 94, 225/95
See application file for complete search history.

(56) References Cited

U.S. PATENT DOCUMENTS

| 485,057 A | 10/1892 | Read |
| 792,089 A | 6/1905 | Towers |
| 1,531,903 A | 3/1925 | Cummins |
| 2,512,862 A | 6/1950 | Ingwer |
| 3,453,651 A | 7/1969 | Wertepny, Sr. |
| 4,048,721 A | 9/1977 | Gunson |
| 4,188,841 A * | 2/1980 | Nakamura et al. ........... 81/9.51 |
| 4,619,387 A | 10/1986 | Shank et al. |
| 4,662,710 A * | 5/1987 | ten Berge ...................... 225/2 |
| 4,982,500 A | 1/1991 | Ramani |
| 5,088,637 A * | 2/1992 | Teurlings ........................ 225/1 |
| 5,531,026 A | 7/1996 | Avery |
| 5,758,422 A | 6/1998 | Frank |
| 5,893,185 A | 4/1999 | Okrepkie et al. |
| 6,070,328 A | 6/2000 | Hasegawa |
| 6,079,297 A | 6/2000 | Chandler et al. |

FOREIGN PATENT DOCUMENTS

| DE | 40 42 360 A1 | 11/1991 |
| GB | 2 153 732 A | 8/1985 |
| JP | 59-195204 | * 11/1984 |

* cited by examiner

*Primary Examiner*—Clark F. Dexter
(74) *Attorney, Agent, or Firm*—Cook,Alex, McFarron,Manzo,Cummings & Mehler, Ltd.

(57) ABSTRACT

A held method of cutting a fiber optic cable having an optical fiber surrounded by at least one protective layer comprises providing a cutting tool having opposingly directed blunt surfaces and opposingly directed sharp surfaces. The cutting tool is movable between an opened position and a closed position. This method also comprises the steps of positioning the fiber optic cable between the opposingly directed blunt surfaces and moving the cutting tool toward the closed position sufficiently to crush the optical fiber without cutting through the protective layer. The method further comprises the steps of moving the cutting tool toward the opened position sufficiently to release the fiber optic cable from between the blunt surfaces, positioning the fiber optic cable between the opposingly directed sharp surfaces and moving the cutting tool toward the closed position sufficiently to cut through the protective layer.

1 Claim, 1 Drawing Sheet

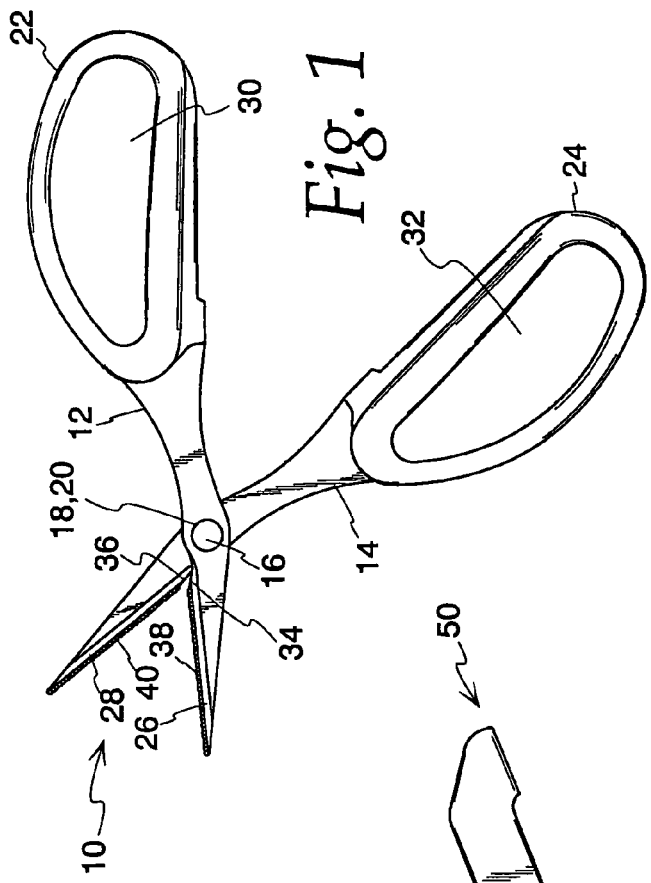
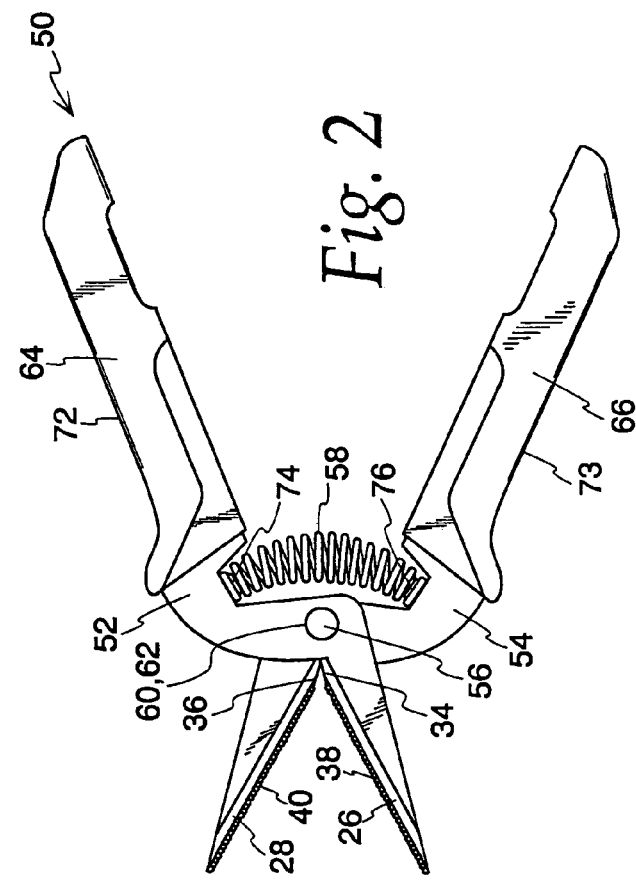
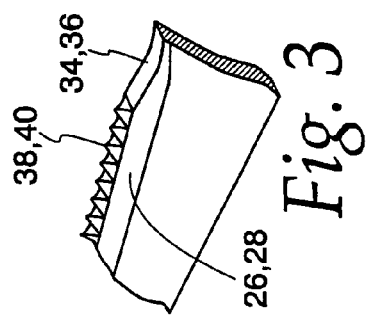

METHOD OF CUTTING A FIBER OPTIC CABLE

CROSS REFERENCE TO RELATED APPLICATION

This application is a divisional application of Ser. No. 09/641,715, filed Aug. 21, 2000 now abandoned, which is incorporated by reference herein.

BACKGROUND OF THE INVENTION

This invention relates to hand tools for cutting cables, and, more particularly, to a hand tool for cutting a fiber optic cable.

A fiber optic cable typically comprises an optical fiber concentrically surrounded by a series of protective layers. The optical fiber is formed of a hard and brittle material, such as glass, that provides a path for optical signals to travel along. The optical fiber is surrounded by a layer of strengthening fibers, such as KEVLAR, to provide strength to the fiber optic cable for pulling the fiber optic cable through a conduit. An outer layer of a polymeric material, such as PVC, surrounds the layer of strengthening fibers. The outer layer of polymeric material provides the optical fiber with additional protection from damages or nicks and dampens any shock.

Hand-held cutting tools having sharp blade edges exist for cutting cables, including those cables comprising KEVLAR. However, should such cutting tools be used to cut fiber optic cables, the cutting tools will not be capable of repeated usage. The optical fiber of the fiber optic cable is formed of a hard material. Cutting through the hard optical fiber dulls the blade of the cutting tool prematurely.

Therefore, a need exists for a hand tool for cutting fiber optic cable with the capability of repeated usage.

SUMMARY OF THE INVENTION

This invention relates to a hand-held cutting tool for cutting a fiber optic cable having an optical fiber surrounded by at least one protective layer. The hand-held cutting tool comprises a first cutting member and a second cutting member. The first cutting member is attached to the second cutting member allowing for movement between an opened position and a closed position. The first cutting member has a blunt surface and a sharp surface. The second cutting member has a blunt surface and a sharp surface. The blunt surface of the first cutting member and the blunt surface of the second cutting member are capable of crushing the optical fiber without cutting through the protective layer. The sharp surface of the first cutting member and the sharp surface of the second cutting member are capable of cutting through the protective layer.

BRIEF DESCRIPTION OF THE DRAWINGS

FIG. 1 is a front view of a hand-held cutting tool of the first embodiment;

FIG. 2 is a front view of a hand-held cutting tool of the second embodiment; and FIG. 3 is an enlarged perspective view of the cutting edge of the hand-held cutting tools of FIGS. 1 and 2.

DETAILED DESCRIPTION OF THE INVENTION

The hand-held cutting tool of the first embodiment of the present invention for cutting a fiber optic cable is illustrated in FIG. 1. The first embodiment of a hand-held cutting tool is a scissor-type cutter. The cutting tool 10 of the first embodiment comprises a first cutting member 12, a second cutting member 14 and a pin 16 for pivotably connecting the first cutting member 12 to the second cutting member 14.

Each cutting member 12 and 14 has a pivot hole 18 and 20 defined therein for attaching the cutting members 12 and 14 to the pin 16. Each cutting member 12 and 14 further has a handle 22 and 24 formed at one end of the cutting member 12 and 14 and a cutting edge 26 and 28 formed at the other end of the cutting member 12 and 14. The handles 22 and 24 are approximately oval shaped, having approximately oval-shaped openings 30 and 32 defined therein for the user to insert his or her fingers into the handles 22 and 24. The handles 22 and 24 can be further covered with a polymeric material for easier grip by the user.

The cutting edge 26 and 28 of each cutting member 12 and 14 is located at one edge of the cutting member 12 and 14, such that upon the cutting members 12 and 14 being pivotably attached, the cutting edge 26 or 28 of one cutting member 12 or 14 is directed toward the cutting edge 28 or 26 of the other cutting member 14 or 12. As shown in detail in FIG. 3, each cutting edge 26 and 28 has a blunt surface 34 and 36 located radially outwardly of the pivot hole 18 and 20 and a sharp surface 38 and 40 located radially outwardly of the blunt surface 34 and 36. Since greater cutting force can be applied at the radially inwardly portion of the cutting edge, it is desirable for the blunt surfaces 34 and 36 to be radially inwardly of the sharp surfaces 38 and 40; thus, allowing the blunt surfaces 34 and 36 to generate greater cutting force to crush the optical fiber. With the blunt surfaces 34 and 36 of both cutting members 12 and 14 radially inwardly of the sharp surfaces 38 and 40 and of approximately the same length, the blunt surface 34 of the first cutting member 12 is opposingly directed toward the blunt surface 36 of the second cutting member 14 and the sharp surface 38 of the first cutting member 12 is opposingly directed toward the sharp surface 40 of the second cutting member 14. Although not necessary, it is also desirable for the sharp surfaces 38 and 40 to be serrated. The serration allows the sharp surfaces 38 and 40 to better grip the fiber optic cable, preventing the fiber optic cable from sliding radially outwardly upon closing the cutting tool 10. To allow the sharp surfaces to remain sharp after repeated usage, the sharp surfaces 38 and 40 can be chrome plated to increase the hardness of the sharp surfaces.

The first embodiment of a hand-held cutting tool 10 functions as follows. The first cutting member 12 and the second cutting member 14 are pivotably connected by a pin 16 allowing the user to pivotably open the hand-held cutting tool 10 and to pivotably close the hand-held cutting tool 10. The closing movement of the hand-held cutting tool 10 causes the cutting edges 26 and 28 of the cutting members 12 and 14 to move toward each other. To cut a fiber optic cable comprising an optical fiber concentrically surrounded by a layer of KEVLAR strengthening fibers and an outer layer of PVC surrounding the layer of KEVLAR fibers, the user of the cutting tool 10 first inserts the fiber optic cable between the opposingly directed blunt surfaces 34 and 36 and then closes the cutting tool 10. The closing movement of the cutting tool 10 crushes the optical fiber and cuts a portion of the PVC layer. The user then opens the cutting tool 10 and inserts the fiber optic cable between the sharp surfaces 38 and 40 such that the cut portion of the PVC layer is located directly inwardly of the sharp surfaces 38 and 40 of the cutting tool 10. The user then closes the cutting tool 10 to cut through the KEVLAR fibers and the PVC layer.

The hand-held cutting tool of the second embodiment of the present invention for cutting a fiber optic cable is illustrated in FIG. 2. The cutting tool 50 of the second embodiment is similar to the cutting tool 10 of the first embodiment, but includes a spring for biasing the cutting tool of the second embodiment toward an opened position. The cutting tool of the second embodiment comprises a first cutting member 52, a second cutting member 54, a pin 56 and a coil spring 58.

Each cutting member 52 and 54 has a pivot hole 60 and 62 defined therein for attaching the cutting members 52 and 54 to the pin 56. Each cutting member 52 and 54 further has a handle 64 and 66 formed at one end of the cutting member 52 and 54 and a cutting edge 26 and 28 formed at the other end of the cutting member 52 and 54. The handles 64 and 66 have approximately straight outer surfaces 72 and 73 allowing the user to comfortably grip the outer surfaces 72 and 73 of the handles 64 and 66. Located radially outwardly of the pivot holes 60 and 62 toward the direction of the handles 64 and 66 and directed circumferentially inwardly are a set of spring retention protrusions 74 and 76. The coil spring 58 is situated and retained between the spring retention protrusions 74 and 76. The coil spring 58 causes the cutting members 52 and 54 to spring outwardly; therefore, biasing the cutting tool 50 toward an opened position.

The cutting edge 26 and 28 of each cutting member 52 and 54 is located at one edge of the cutting member 52 and 54, such that upon the cutting members 52 and 54 being pivotably attached, the cutting edge 26 or 28 of one cutting member 52 or 54 is directed toward the cutting edge 28 or 26 of the other cutting member 54 or 52. As shown in detail in FIG. 3, each cutting edge 26 and 28 has a blunt surface 34 and 36 located radially outwardly of the pivot hole 60 and 62 and a sharp surface 38 and 40 located radially outwardly of the blunt surface 34 and 36. Since greater cutting force can be applied at the radially inwardly portion of the cutting edge, it is desirable for the blunt surfaces 34 and 36 to be radially inwardly of the sharp surfaces 38 and 40; thus, allowing the blunt surfaces 34 and 36 to generate greater cutting force to crush the optical fiber. With the blunt surfaces 34 and 36 of both cutting members 52 and 54 radially inwardly of the sharp surfaces 38 and 40 and of approximately the same length, the blunt surface 34 of the first cutting member 52 is opposingly directed toward the blunt surface 36 of the second cutting member 54 and the sharp surface 38 of the first cutting member 52 is opposingly directed toward the sharp surface 40 of the second cutting member 54. Although not necessary, it is also desirable for the sharp surfaces 38 and 40 to be serrated. The serration allows the sharp surfaces 38 and 40 to better grip the fiber optic cable, preventing the fiber optic cable from sliding radially outwardly upon closing the cutting tool 50. To allow the sharp surfaces to remain sharp after repeated usage, the sharp surfaces 38 and 40 can be chrome plated to increase the hardness of the sharp surfaces.

The second embodiment of a hand-held cutting tool 50 functions as follows. The first cutting member 52 and the second cutting member 54 are pivotably connected by a pin 56 allowing the user to pivotably open the hand-held cutting tool 50 and to pivotably close the hand-held cutting tool 50. The closing movement of the hand-held cutting tool 50 causes the cutting edges 26 and 28 of the cutting members 52 and 54 to move toward each other. To cut a fiber optic cable comprising an optical fiber concentrically surrounded by a layer of KEVLAR strengthening fibers and an outer layer of PVC surrounding the layer of KEVLAR fibers, the user of the cutting tool 50 first inserts the fiber optic cable between the opposingly directed blunt surfaces 34 and 36 and then closes the cutting tool 50. The closing movement of the cutting tool 50 crushes the optical fiber and cuts a portion of the PVC layer. The user then opens the cutting tool 50 and inserts the fiber optic cable between the sharp surfaces 38 and 40 such that the cut portion of the PVC layer is located directly inwardly of the sharp surfaces 38 and 40 of the cutting tool 50. The user then closes the cutting tool 50 to cut through the KEVLAR fibers and the PVC layer.

Various features of the present invention have been described with reference to the embodiments shown and described. It should be understood, however, that modifications may be made without departing from the spirit and scope of the invention as represented by the following claims.

What is claimed is:

1. A method of cutting a fiber optic cable having an optical fiber surrounded by at least one protective layer comprising the steps of:
   a) providing a cutting tool having opposingly directed blunt surfaces and opposingly directed sharp surfaces, said cutting tool movable between an opened and a closed position;
   b) positioning said fiber optic cable between said opposingly directed blunt surfaces;
   c) moving said cutting tool toward the closed position sufficiently to crush said optical fiber without cutting through said protective layer;
   d) moving said cutting tool toward the opened position sufficiently to release the fiber optic cable from between the blunt surfaces;
   e) positioning said fiber optic cable between said opposingly directed sharp surfaces; and
   f) moving said cutting tool toward the closed position sufficiently to cut through said protective layer.

* * * * *